(12) United States Patent
Matuszak et al.

(10) Patent No.: US 8,445,777 B2
(45) Date of Patent: May 21, 2013

(54) GAS INSULATED BUS SYSTEM CONFIGURATION

(75) Inventors: Dennis J. Matuszak, Seven Fields, PA (US); David F. Giegel, McDonald, PA (US); Douglas A. Herman, Sewickley, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 316 days.

(21) Appl. No.: 12/885,226

(22) Filed: Sep. 17, 2010

(65) Prior Publication Data

US 2012/0067621 A1    Mar. 22, 2012

(51) Int. Cl.
*H02G 15/20* (2006.01)

(52) U.S. Cl.
USPC ...................................... 174/21 C

(58) Field of Classification Search
USPC .............. 174/21 C, 28, 21 R, 72 R
See application file for complete search history.

(56) References Cited

U.S. PATENT DOCUMENTS

| | | | | |
|---|---|---|---|---|
| 3,546,356 A | * | 12/1970 | Graybill et al. | 174/21 C |
| 3,943,315 A | | 3/1976 | Taylor et al. | |
| 4,017,675 A | * | 4/1977 | Hopkins et al. | 174/21 C |
| 4,029,890 A | | 6/1977 | Nakata | |
| 4,096,345 A | | 6/1978 | Kemeny | |
| 4,370,511 A | | 1/1983 | Cookson et al. | |
| 4,550,219 A | | 10/1985 | Bolin et al. | |
| 5,565,652 A | * | 10/1996 | Frye | 174/24 |
| 5,571,990 A | * | 11/1996 | Pham et al. | 174/24 |
| 5,654,526 A | * | 8/1997 | Sharp | 174/84 R |
| 5,689,088 A | * | 11/1997 | Rokunohe et al. | 174/21 C |
| 5,811,734 A | * | 9/1998 | Ponsioen | 174/99 B |

* cited by examiner

*Primary Examiner* — Chau Nguyen
(74) *Attorney, Agent, or Firm* — One LLP

(57) ABSTRACT

Gas insulated bus (GIB) systems and methods are provided that facilitate efficient cost control and resource utilization. A GIB system assembly includes one or more GIB runs which include a maximum number of a first GIB section components having a predetermined length and a second GIB section component having a custom or variable length coupled to one of the one or more first GIB section components at their flanged ends, and first and second tee-shaped connectors coupled to one of the one or more first GIB section components and the second GIB section component and used to couple the GIB runs together and orient the bus runs at a desired bus routing angle.

3 Claims, 4 Drawing Sheets

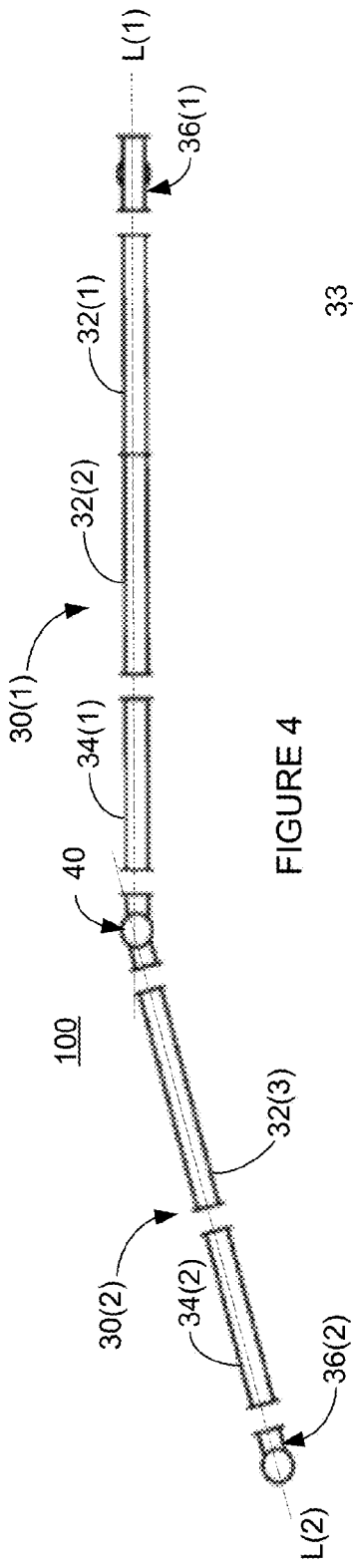
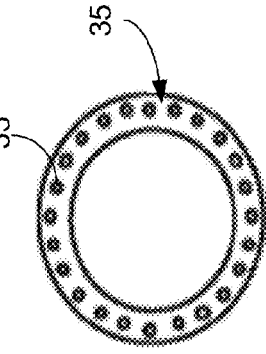
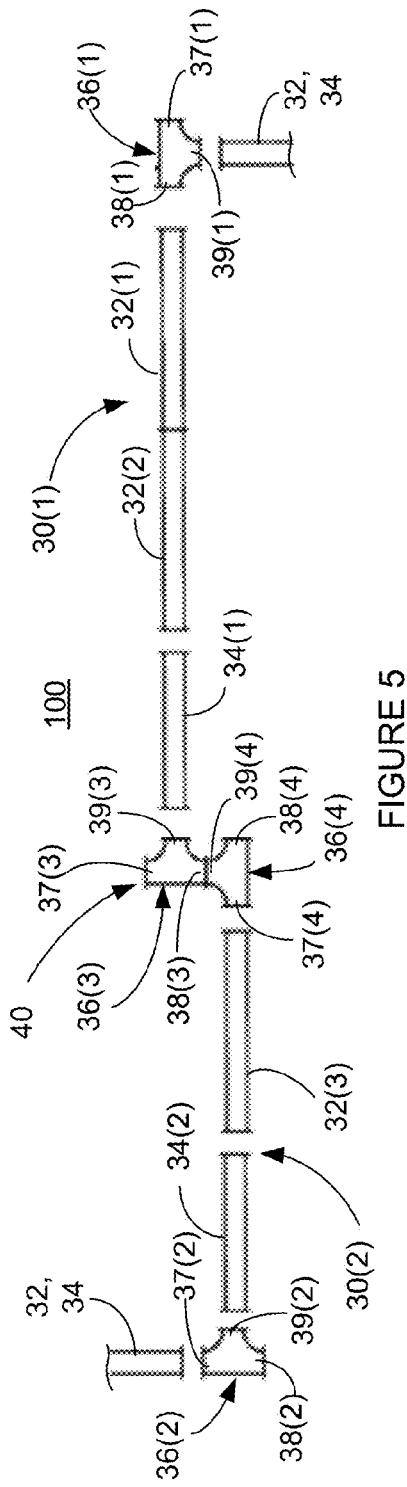
FIGURE 4
FIGURE 6
FIGURE 5

GAS INSULATED BUS SYSTEM CONFIGURATION

FIELD

The present invention relates to gas insulated bus systems and, more particularly, to a gas insulated bus system configuration that facilitates an efficient control of costs and utilization of resources.

BACKGROUND

Gas-insulated bus systems (GIB) are employed as an alternative to cables, busbars, or other conductor types to transmit high voltage electric power between two or more control devices and/or other termination points. Conventional GIB systems typically comprise straight and/or angle connectors that are fabricated, assembled, and/or otherwise constructed uniquely to suit the geometry of each individual field site configuration. This approach requires components to be fabricated on an order by order basis resulting in an inefficient and costly utilization of factory resources. The resulting time from order to construction of the GIB systems is often quite long.

It is desirable to provide a GIB system that enables efficient control of costs and utilization of factory resources, and reduces the time required between receipt of orders and actual construction of GIB systems, which ultimately reduces costs of completed GIB systems.

SUMMARY

Embodiments provided herein are directed to gas insulated bus (GIB) systems and methods that facilitate an efficient control of costs and utilization of resources. In one embodiment, a GIB run includes one or more off-the-shelf standardized GIB section components having a predetermined standardized length and a custom GIB section component having a variable or custom length. The custom GIB is coupled to one of the one or more off-the-shelf standardized GIB section components at their flanged ends, and first and second tee-shaped connectors are coupled to one of the one or more off-the-shelf standardized GIB section components and the custom GIB section component. In another embodiment, a GIB system assembly includes two or more GIB runs as described above that can be coupled together using the tee-shaped connectors of the GIB runs. The tee-shaped connectors can be oriented to accommodate a desired bus routing angle. In a further embodiment, a GIB system order and installation process includes receiving a GIB system installation order, optimizing the configuration of the GIB system to include a maximum number of one or more off-the-shelf standardized GIB section components and one custom GIB section component per each GIB run of the GIB system, shipping tee-shaped connectors and the off-the-shelf standardized GIB section components from stock, manufacturing custom GIB section components, shipping the custom GIB section components, assembling a plurality of GIB runs comprising one or more off-the-shelf standardized GIB section components and one custom GIB section component, and coupling two of the plurality of GIB runs together using the tee-shaped connectors while orienting the tee-shaped connectors to accommodate the desired bus routing angles of the bus runs.

Other systems, methods, features and advantages of the example embodiments will be or will become apparent to one with skill in the art upon examination of the following figures and detailed description.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 4 is a plan view of a partial GIB system assembly.

FIG. 5 is a side elevation view of the partial GIB system assembly shown in FIG. 4.

FIG. 6 is an elevation view of a flange connector.

It should be noted that elements of similar structures or functions are generally represented by like reference numerals for illustrative purpose throughout the figures. It should also be noted that the figures are only intended to facilitate the description of the preferred embodiments.

DESCRIPTION

Each of the additional features and teachings disclosed below can be utilized separately or in conjunction with other features and teachings to produce a gas-insulated high voltage bus system configuration utilizing standardized components. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Embodiments described herein are directed to improved systems and methods for the configuration and assembly of a gas-insulated bus (GIB) for high voltage transmission systems that utilize off-the-shelf standardized components having predetermined lengths and configurations in various orientations to achieve numerous custom geometric configurations. As a result, the system and method described herein enable standard components to be fabricated in lower-cost quantities and assembled to suit convenient factory schedules, which enables efficient control of costs and utilization of factory resources. In addition, the time required between receipt of orders and actual construction of GIB systems tends to be reduced, which ultimately reduces costs of completed GIB systems.

Figure 1:
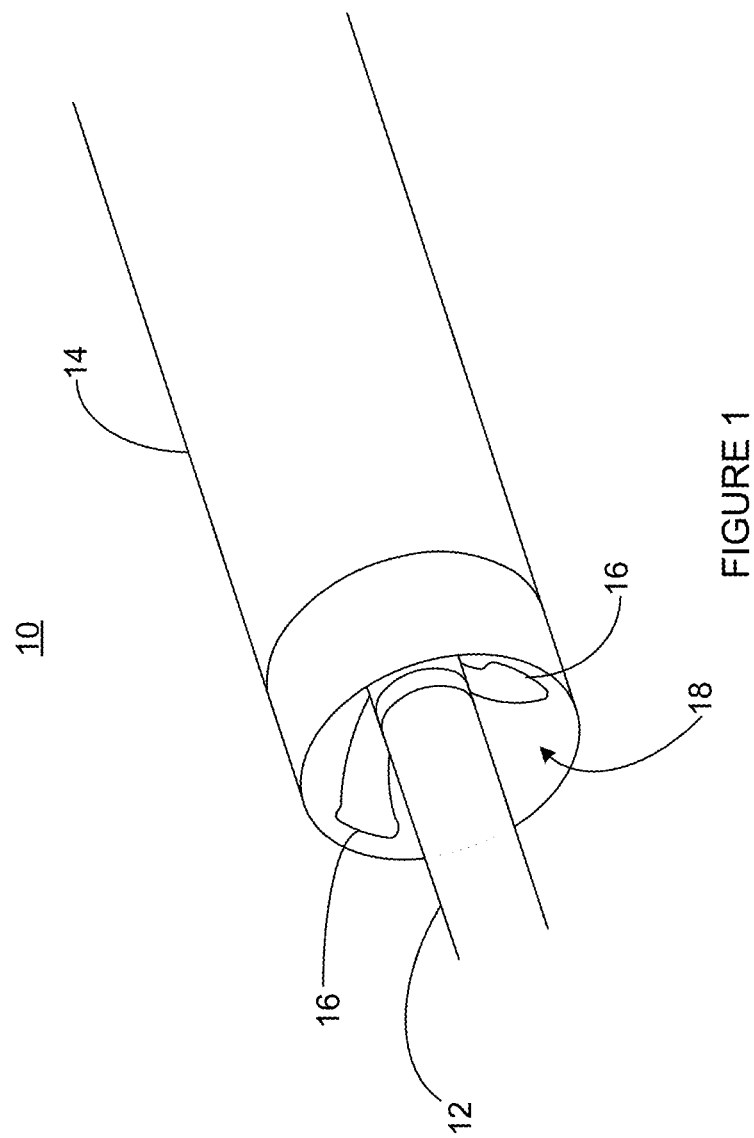
FIG. 1 is a perspective view of a conventional gas-insulated busbar.

Referring in detail to the figures, a GIB system configuration and assembly is described. FIG. 1 shows a gas-insulated busbar (GIB) section 10 that is part of the GIB system. The GIB section 10 comprises a grounded cylindrical hollow metallic enclosure 14 with an interior metallic cylindrical conductor 12 coaxially located in the center of the enclosure 14 by supports 16, which are made of insulating material. The space 18 between the inner conductor 12 and the enclosure 14 is filled with an insulating gas.

Figure 2:
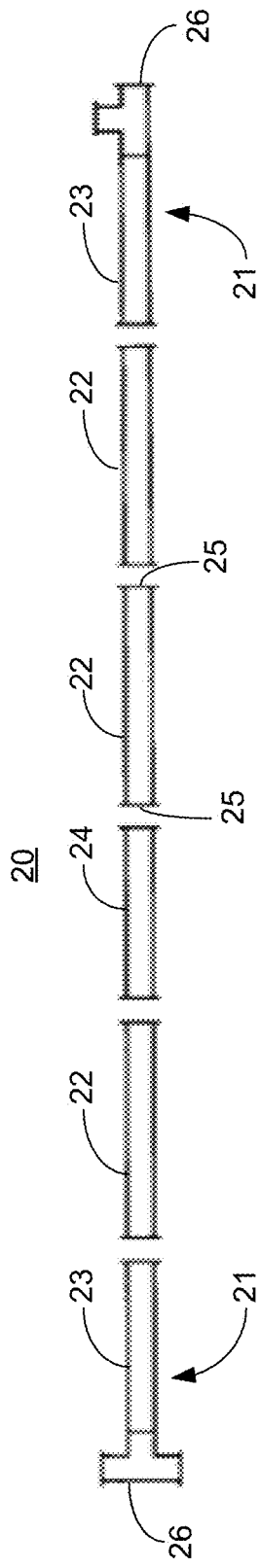
FIG. 2 is a side elevation view of a conventional bus run.

FIG. 2 shows a convention GIB run 20 comprising a plurality of standard or off-the-shelf GIB sections 22 having a predetermined standardized length and one custom GIB section 24 having a custom or variable length with adjacent GIB sections being coupled to one another at their flanged ends 25. Each end of the GIB run 20 includes a fabricated connector assembly 21 comprising a fabricated tee-shaped connector 26 permanently attached at one of its arms to a non-flanged end of a GIB section 23 having a customized length. Only the standard length sections 22 can be cost effectively built in bulk and kept in stock. The variable length sections 23 and 24 are custom built per individual orders or installation.

Figure 3:
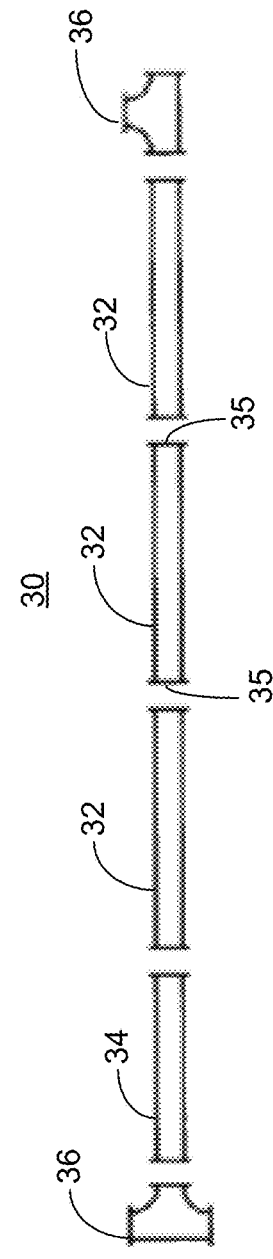
FIG. 3 is a side elevation view of an alternative bus run.

FIG. 3 shows an alternative GIB run 30 having an optimized configuration comprising a plurality of standard or off-the-shelf sections 32 having a predetermined standardized length and one custom section 34 having a custom or variable length with adjacent GIB sections being coupled to one another at their flanged ends 35. Each end of the GIB run 30 includes a cast tee-shaped connector 36 attached at one of its arms to a flanged end of the custom or variable length section 34 or a standard length section 32. The standard length sections 32 and the cast tee-shaped connectors 36 are cost effectively built in bulk and kept in stock. The variable length runs 34 are custom built per individual orders or installation.

FIGS. 4 and 5 show a GIB system assembly 100 using, e.g., a plurality of the GIB runs 30 shown in FIG. 3 and coupling them together in a desired bus routing configuration. To minimize cost and lead time from time of order to construction of the GIB system 100, the bus routing of the GIB system 100 is designed to include a maximum number of standard length off-the-shelf GIB sections 32 and a minimum number of custom length GIB sections 34, i.e., each GIB run 30 preferably comprises no more than one variable length or custom GIB section 34. Single tee-shaped connectors 36 are used to realize 90-degree angular changes in bus routing direction. Instead of using custom angled connectors, swing connector assemblies 40 comprising two or more tee-shaped connectors 36 are used to realize angular changes other than 90-degrees in bus routing direction. Angular orientations are varied by rotating the relative alignment of two "tee" connectors 36 over increments established by the angle between the bolt holes 33 of their connection flange 35 (see FIG. 6).

As depicted in FIGS. 4 and 5, a first GIB run 30(1) includes first and second off-the-shelf standard length GIB sections 32(1) and 32(2) coupled together at one of their flanged ends and a first custom length GIB section 34(1) coupled to the second standard length GIB section 32(2) at its free flanged end. A first tee-shaped connector 36(1) is coupled at a side arm 38(1) to the first standard length GIB section 32(1) at its free flanged end. An undefined GIB section 32, 34 is shown extending from the center arm 39(1) of the first tee-shaped connector 36(1).

A second GIB bus run 30(2) includes a third off-the-shelf standard length GIB section 32(3) and a second custom length GIB section 34(2) coupled together at one of their flanged ends. A second tee-shaped connector 36(2) is coupled at a center arm 39(2) to the second custom length GIB section 34(2) at its free flanged end. An undefined GIB section 32, 34 is shown extending from a side arm 37(2) of the second tee-shaped connector 36(2).

One skilled in the art will readily recognize that the three standard length sections 32(1), 32(2) and 32(3) could comprise one, two, three or a multitude of standard length GIB sections 32, the number of which depends on the bus routing configuration for a given GIB system installation.

The first and second GIB runs 30(1) and 30(2) are coupled together using a swing connector assembly 40 comprising third and fourth tee-shaped connectors 36(3) and 36(4). The third tee-shaped connector 36(3) is coupled at a center arm 39(3) to the first custom length GIB section 34(1) at its free flanged end. The fourth tee-shaped connector 36(4) is coupled at a side arm 37(4) to the third standard length GIB section 32(3) at its free flanged end and at a center arm 39(4) to a side arm 38(3) of the third tee-shaped connector 36(3).

As depicted, the third and fourth tee-shaped connectors 36(3) and 36(4) are coupled in a manner that orients the longitudinal axis L(2) of the second GIB run 30(2) relative to the longitudinal axis L(1) of the first GIB run 30(1) at an angle other than 90 degrees in the plane of the page.

The free leg of each of the tee-shaped connectors 36(1), 36(2), 36(3) and 36(4) is fitted with a removable cover for connection, inspection, or other accesses to the internal conductor connections.

Figure 7:
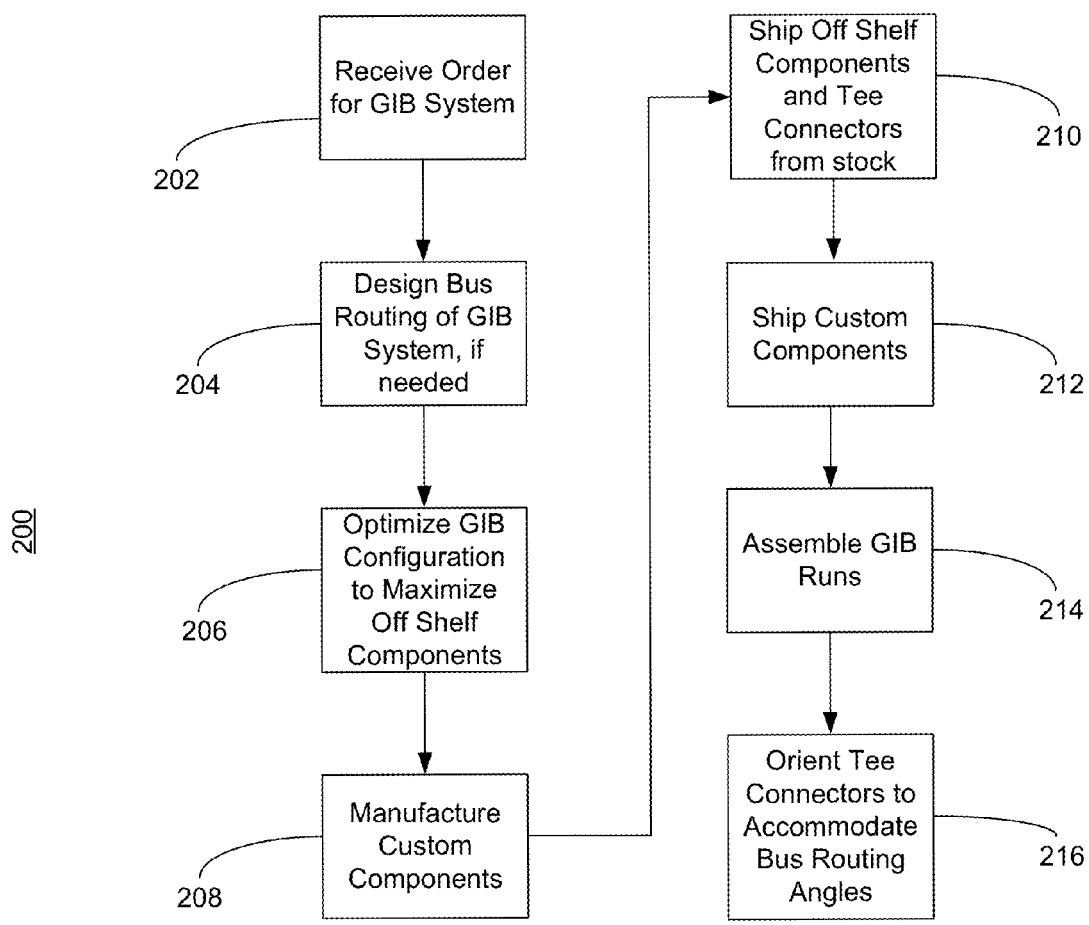
FIG. 7 is a diagram of a GIB system order and installation process.

Referring to FIG. 7, a GIB system order and installation process 200 is depicted. Once an order for a GIB system is received at step 202, the bus routing of the GIB system is designed at step 204 if the order does not already include such design. Once the design of the bus routing of the GIB system is received, the configuration of the GIB system is optimized at step 206 to include a maximum number of standardized or off-the-shelf GIB section components 32 per GIB run and preferably limit the number of custom length GIB section components 34 per GIB run to one. At step 208, the custom length GIB section components are manufactured. Next, the tee connectors 36 or connector assemblies 40 and the standardized off-the-shelf GIB section components 32 are shipped from stock at step 210 to the installation site for assembly of the GIB system. At step 212, the custom length GIB section components 34 are shipped upon completion of manufacture to the installation site for assembly of the GIB system. The GIB runs 30 are assembled at step 214 and coupled together at step 216 while orienting the tee-shaped connectors 36 to accommodate the desired bus routing angles.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed:

1. A GIB system assembly comprising first and second GIB runs, wherein each of the GIB runs comprises one or more first GIB section components having a hollow cylindrical enclosure with flanged ends and a standardized predetermined length and a cylindrically conductor located coaxially within the enclosure, and a second GIB section component having a hollow cylindrical enclosure with flanged ends and a custom or variable length and a cylindrically conductor located coaxially within the enclosure, wherein the second GIB section component is coupled at a first flanged end to a first flanged end of a first one of the one or more first GIB section components, and a connector assembly coupled to a first end of the first and second GIB runs, the connector assembly comprising first and second tee-shape connectors coupled to one another, the tee-shaped connectors having first, second and third arms with the first and second arms extending from one another at 180 degrees and extending from the third arm at 90 degrees, wherein one of the first, second and third arms of the first tee-shape connector is coupled to a first end of the first GIB run and one of the first, second and third arms of the first tee-shape connector is coupled to one of the first, second and third arms of the second tee-shape connector, and one of the first, second and third arms of the second tee-shape connector is coupled to a first end of the second GIB run, and wherein the first and second tee shape connectors of the connector assembly are configurable to accommodate a desired bus routing angle between 0 and 360 degrees.

2. The GIB system of claim 1 wherein one of the first, second and third arms of the first and second GIB runs is capped.

3. The GIB system of claim 1 wherein the first GIB run further comprises a second one of the one or more first GIB section components coupled at first flanged end to a second flanged end of the second GIB section or the first one of the one or more first GIB section components.

* * * * *